US006960409B2

(12) United States Patent
Qu

(10) Patent No.: US 6,960,409 B2
(45) Date of Patent: Nov. 1, 2005

(54) HIGH DISCHARGE RATE ALKALINE BATTERY

(75) Inventor: Deyang Qu, Madison, WI (US)

(73) Assignee: Rovcal, Inc., Fresno, CA (US)

(*) Notice: Subject to any disclaimer, the term of this patent is extended or adjusted under 35 U.S.C. 154(b) by 271 days.

(21) Appl. No.: 09/950,308

(22) Filed: Sep. 10, 2001

(65) Prior Publication Data

US 2003/0049531 A1 Mar. 13, 2003

(51) Int. Cl.[7] .............................................. H01M 4/50

(52) U.S. Cl. ..................................................... 429/224

(58) Field of Search ........................... 29/623.1; 429/224

(56) References Cited

U.S. PATENT DOCUMENTS

| | | | |
|---|---|---|---|
| 5,489,493 | A | 2/1996 | Urry |
| 6,143,446 | A | 11/2000 | Davis et al. |
| 6,190,800 | B1 * | 2/2001 | Iltchev et al. ............... 429/224 |
| 6,342,317 | B1 | 1/2002 | Patel et al. |
| 6,410,187 | B1 | 6/2002 | Luo et al. |
| 6,620,550 | B2 * | 9/2003 | Christian et al. ........... 429/224 |

FOREIGN PATENT DOCUMENTS

| | | |
|---|---|---|
| WO | WO 00/37714 | 6/2000 |
| WO | WO 01/56931 | 8/2001 |
| WO | WO 02/59991 | 8/2002 |

OTHER PUBLICATIONS

Linden (R.F. Scarr and J.C. Hunter in "Alkaline-Manganese Dioxide Cells", Handbook of Batteries, Second Edition, Edited by David Linden, McGraw-Hill, Inc.: New York (1996), pp. 10.1–10.24), no month.*

Ilehev et al. "The lithium–manganese dioxide cell, IV. Relationship between physicochemical properties and electrochemical characteristics of MnO2 in nonaqueous electrolytes." Journal of Power Sources, 35 (1991) p. 175–181, no month.*

Lee, et al., "Relationship of cathode pore–size distribution and rated capacity in Li/MnO2 Cells," Journal of Power Sources 44:709–712 (1993), Apr.

Piao, et al., "Synthesis of carbon/EMD composite from carbon/suspended sulfuric acid and manganese sulfate bath," Journal of Power Sources 51:391–402 (1994), Oct.

Williams, et al., "High Drain Discharge Performance of EMD," Progress in Batteries & Battery Materials 15:48–56 (1996), no month.

Yamamura, et al., "A New Chemical Manganese Dioxide for Dry Batteries—Cellmax (CMD–U, CMD–1)," Progress in Batteries & Solar Cells 10:56–75 (1991), no month.

* cited by examiner

Primary Examiner—Susy Tsang-Foster
(74) Attorney, Agent, or Firm—Quarles & Brady LLP

(57) ABSTRACT

The present invention provides a primary alkaline battery having a cathode made of porous manganese dioxide, wherein a significant portion of the total pore volume of the manganese dioxide comprises pores which are large. Preferably, at least thirty percent of the total pores of the manganese dioxide are greater than substantially sixty Angstroms. The use of large pore manganese dioxide increases the discharge output and time of the battery, and further decreases manufacturing problems related to die pressing cathode rings from manganese dioxide by reducing the "spring back" or "bounce back" of the manganese dioxide as measured in the die set and after being removed from the die set.

5 Claims, 4 Drawing Sheets

HIGH DISCHARGE RATE ALKALINE BATTERY

CROSS-REFERENCE TO RELATED APPLICATIONS

Not applicable.

STATEMENT REGARDING FEDERALLY SPONSORED RESEARCH OR DEVELOPMENT

Not applicable

BACKGROUND OF THE INVENTION

The present invention relates to primary alkaline electrochemical cells having an anode, a separator, an electrolytic solution, and a cathode constructed with an electrolytic manganese dioxide ("EMD") characterized in that the EMD includes a significant number of large pores. The use of EMD including a high percentage of large pores provides the alkaline battery with improved performance during high discharge rate applications, and also minimizes spring back or rebounce in the die press construction of cathodes.

Small primary electrochemical cells have been commercially available for more than a century. The most successful of these cells have been the cylindrical alkaline batteries of the well known "AAA", "AA", "C" and "D" sizes. Most alkaline batteries generally employ an anode, a cathode, a separator, and an aqueous electrolytic solution. The cathode serves as the battery's positive electrode and is typically formed of a mixture of manganese dioxide and carbon or graphite particles. The anode serves as the battery's negative electrode and is generally formed of zinc particles mixed with a gelling agent, usually carboxymethylcellulose. The separator is disposed between the cathode and the anode and typically comprises of a non-woven, inert fabric. The electrolytic solution, which is able to permeate the separator and admix with both the cathode and the anode throughout the battery, is generally a hydroxide solution, such as potassium hydroxide, and provides a path for the transfer of charged ions between the cathode and the anode when they are connected through an external load.

The current generated by an electrochemical cell is directly related to the total surface area of the electrodes and inversely related to the distance between them. Since commercial cells are primarily fixed to the "AAA", "AA", "C" and "D" size, it has been desirable to attempt to increase the capacity of the cell by increasing the surface area of the electrode active material and by packing greater amounts of the active material into the cell. To increase the current generated, therefore, prior art batteries often employ cathodes which are constructed of low porosity manganese dioxide.

This approach has practical limitations. For example, if the porosity of the active material is too low, the rate of electrochemical reaction during discharge is generally low, thereby providing a relatively slow rate of discharge of the battery. The dense packing of active material may also cause the cell to become polarized. This is especially true with cells that are exposed to high current drain rates. Polarization of such cells limits the mobility of ions within the electrodes' active material and within the electrolyte solution.

A number of different alkaline cells have been designed in an attempt to maximize power output while avoiding the problems discussed above. Most of these designs have involved modifications to at least one of the four primary elements, namely, the anode, cathode, separator or electrolyte solution.

With respect to cathodes, some design modifications have involved increasing the overall porosity of the manganese dioxide in the cathode. For example, U.S. Pat. No. 5,489,493 to Urry discloses a cathode comprised of manganese dioxide in which the manganese dioxide is a mixture of high porosity manganese dioxide and low porosity manganese dioxide, defining an overall percentage of porosity by weight. This approach also has limitations. An overall porosity rate can be achieved in a number of ways, with a number of different types of materials. The porosity rate can be achieved, for example, with a material having a large number of small pores. Alternatively, the porosity rate can be achieved with a material having a mixture of small and large pores. As described below, the effects on discharge rate are not the same under these two defined circumstances. Therefore, batteries constructed with cathodes with equal overall porosity can behave very differently. In particular, the resultant discharge characteristics can vary significantly from battery to battery, thereby making it difficult to predict operating characteristics and failure times or rates.

Furthermore, highly porous manganese dioxide comprising a large number of small holes can be problematic in the manufacturing process. Cathodes are typically produced by means of a die press process. A measured amount of a cathode mix is added to a ring shaped die set, and the cathode mix is formed into a ring. When highly porous material is employed in producing the ring, "spring back" or rebounce is typically a problem. As the die press is removed from the cathode, compressed air trapped in the pores tends to expand. The expanding air can cause the cathode to expand beyond the required diameter for insertion into the cylindrical container or "can" of the battery, thereby causing waste and an associated loss of time and efficiency.

BRIEF SUMMARY OF THE INVENTION

The present invention is a primary alkaline cell having an anode, a cathode, and a separator, wherein the cathode comprises a porous manganese dioxide including a significant number of pores which are relatively large as compared to other pores in the manganese dioxide. Preferably, the relatively large pores are greater than 90 Angstroms, and comprise more than thirty percent of the overall porosity of the manganese dioxide.

The use of manganese dioxide including a significant number of large pores approximately overcomes the deficiencies recognized in the prior art when using small pore size manganese dioxide alone. The large pores in the manganese dioxide increase the speed of the chemical reaction in the battery as compared to configurations in which overall porosity is defined. Specifically, the use of manganese dioxide having large pores provides an easier path for mass diffusion inside the cathode, thereby increasing the speed of the reaction, and increasing the discharge rate of the battery.

One aspect of the invention is the recognition that alkaline cell performance can be enhanced by using a cathode comprising manganese dioxide having a significant number of large pores. The addition of large pores promotes diffusion and increases the reaction time in the battery. However, since overall porosity is not increased, sufficient active material for high current generation is maintained. A battery constructed in accordance with these parameters, therefore, can provide both high current generation and an increased discharge time.

In one embodiment, pores having an average size greater than sixty Angstroms account for at least thirty percent of the total pore volume. However, manganese dioxide materials having lower percentages of large pores have also been effective in alkaline batteries and may be used, either alone or in combination with manganese dioxide having a higher percentage of large pores.

Another aspect of the invention is the recognition that air in larger pores of a manganese dioxide material is more easily removed during the die form process. Therefore, problems associated with "spring back" and debounce are minimized, resulting in reduced waste of both time and materials during the manufacturing process.

One object of the present invention is to improve the discharge performance of alkaline battery cathodes. A second object of the present invention is to provide an improved method of manufacturing a cathode for a high discharge rate alkaline battery.

One advantage of the present invention is that by using manganese dioxide with a large number of large pores, the discharge rate of the battery can be increased while maintaining a relatively high level of current generation.

Another advantage of the present invention is that the use of large pore size manganese dioxide provides a cathode which can be manufactured with a minimal amount of manufacturing waste.

Other objects, features, and advantages of the invention will become apparent from the detailed description of the invention taken in conjunction with the accompanying drawings.

DETAILED DESCRIPTION OF THE INVENTION

Figure 1:
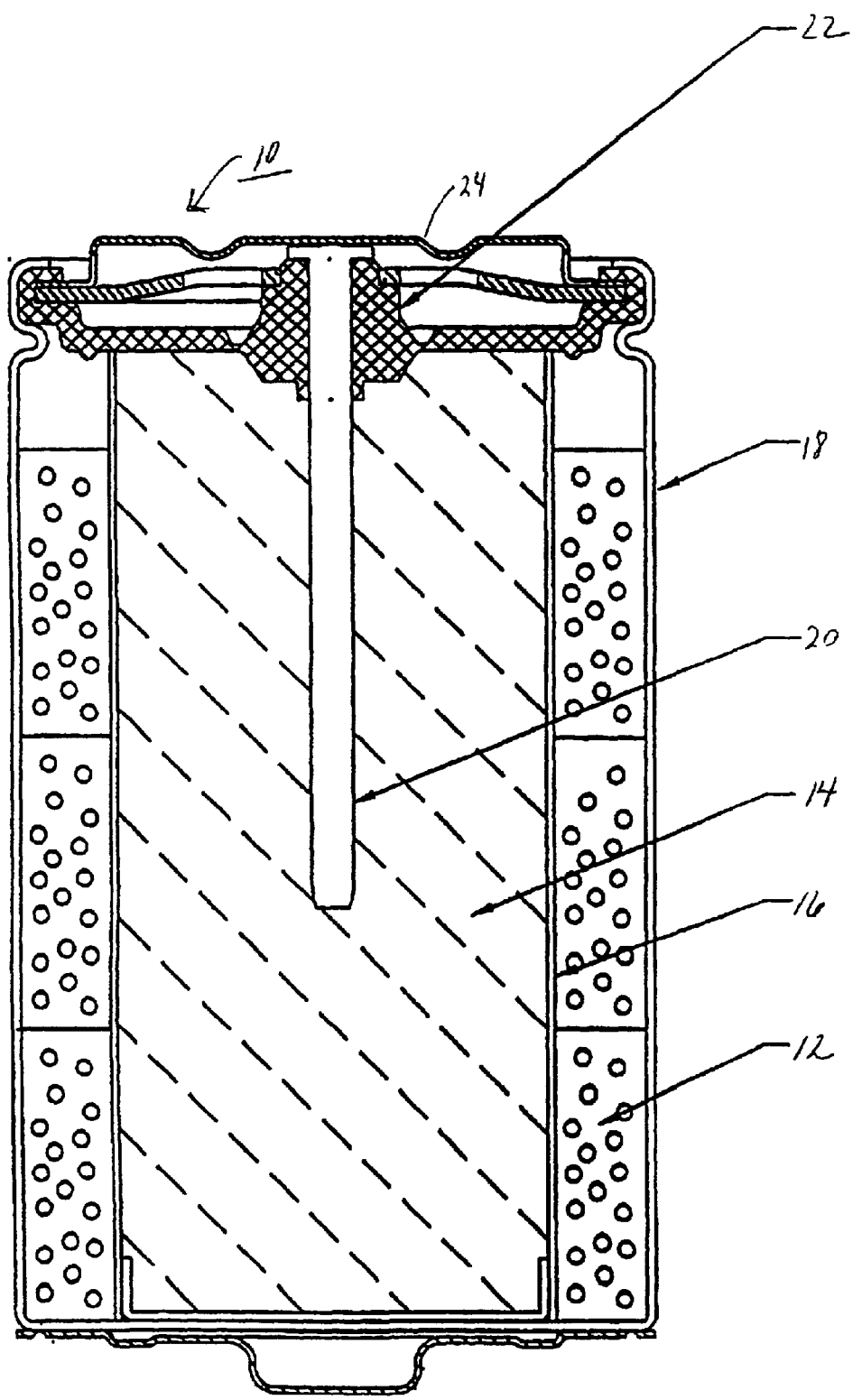
FIG. 1 is a drawing of an alkaline cylindrical battery incorporating the present invention.

FIG. 1 is a cross-sectional diagram of a cylindrical alkaline cell 10 incorporating the present invention. Although a cylindrical cell is shown, the invention may be applied equally well to any primary alkaline cell, without regard to size or shape, including, but not limited to, sizes "AA", "AAA", "AAAA", "C", "D", and "9V".

The cell 10 includes a cathode 12, an anode 14, a separator 16, and a cylindrical metal container 18 that contacts the outer diameter of cathode 12. The cell 10 further includes an anode collector 20 that passes through a seal member 22 and into anode 14. The upper end of anode collector 20 is connected to a negative cap 24 which serves as the negative external terminal of the cell 10. Anode 14 can be a gelled anode or other anode of the type used conventionally in alkaline cells. Anode 14 will typically be a zinc anode, however the present invention can be used with other types of anodes appropriate for the application.

The cell further contains an electrolyte (not shown) such as aqueous potassium hydroxide. As is described hereinafter, the electrolyte is preferably and advantageously a liquid, but could also be in a gelled electrolyte form.

Placed between anode 14 and cathode 12 is the separator 16. The separator allows ions to pass freely between anode 14 and cathode 12, so a chemical reaction that generates the electric current of the battery can take place while physical separation can be maintained between the two electrodes. The separator 16 also resists any migration of the discharge reaction products into the opposing electrode compartments.

The present invention relates more particularly to cathode 12. The cathode 12 comprises a manganese dioxide material having a relatively high concentration of pores having a "large" pore size, where a "large" pore is defined to be substantially equivalent to or greater than about 90 Angstroms. Preferably, the concentration of pores having a large pore size is substantially equivalent to or greater than thirty percent of the total pore volume. The cathode 12 is preferably molded from the manganese dioxide using a die press operation, as is widely known in the art, which comprises the steps of adding a cathode material to a die set and molding the cathode 12 with the use of a die press.

By constructing the cathode 12 with a manganese dioxide material having a high concentration of large pore sizes the deficiencies of the prior art can be overcome, and the performance of the alkaline cell can be enhanced. Specifically, through the use of a cathode 12 constructed of manganese dioxide comprising substantially thirty percent or more of total pore volume having a diameter of greater than sixty Angstroms, the discharge rate of the battery increases. Furthermore, when molding the cathode 12 from a manganese dioxide material having a high concentration of pores having a large pore size, the amount of "spring back" or rebounce in the cathode 12 can be reduced, thereby minimizing waste of both time and materials in the manufacturing process.

Figure 2:
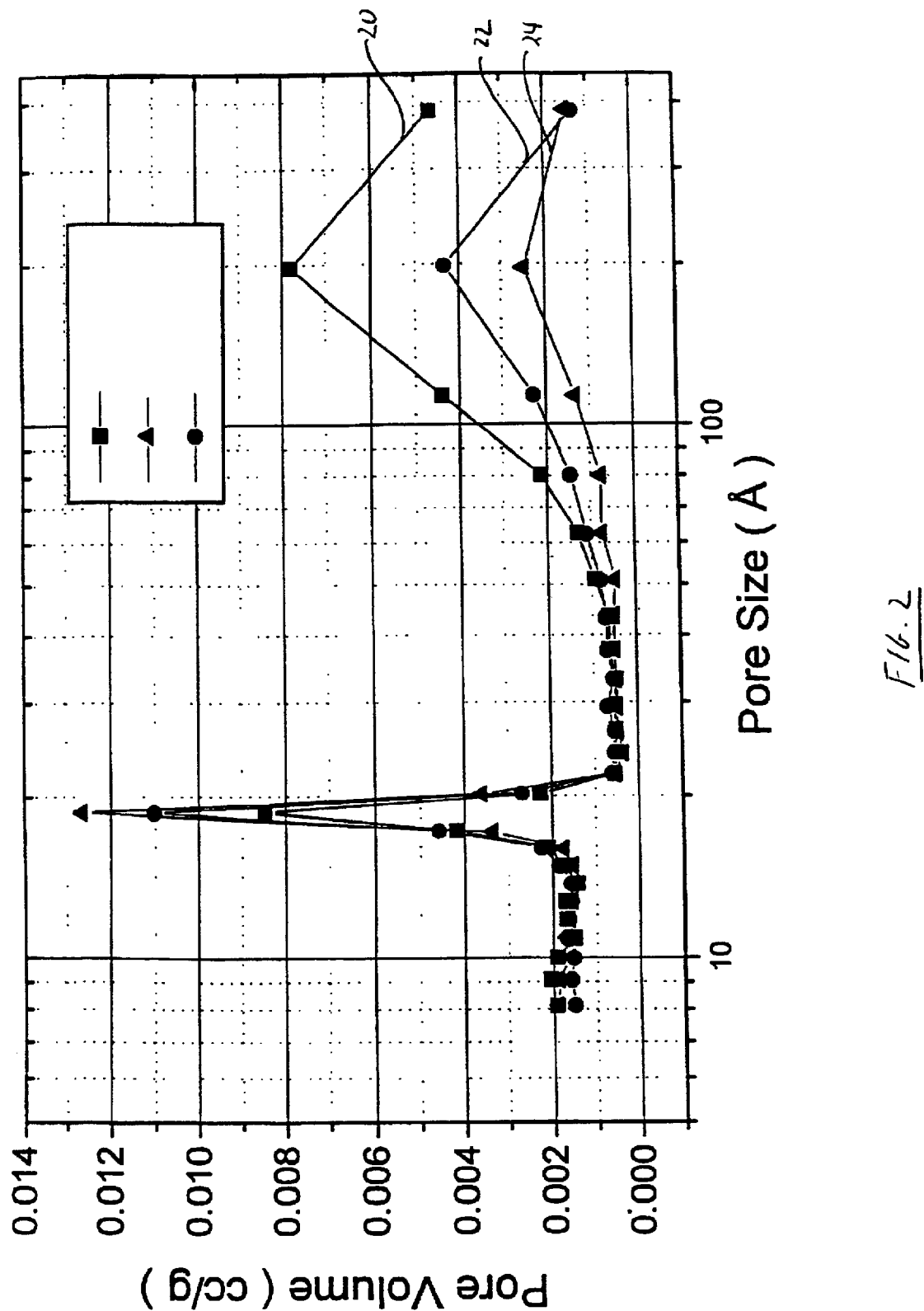
FIG. 2 is a collection of graphs illustrating the pore size distribution of three samples of manganese dioxide materials, the three samples of manganese dioxide having a high percentage, medium percentage, and low percentage of pore sizes substantially equivalent to or greater than sixty Angstroms, respectively.

Referring now to FIG. 2, first, second, and third manganese dioxide materials having varying percentages of large pores were each tested for both discharge time and "spring back" during the manufacturing process. As can be seen from the graph of FIG. 2, 36.2% of the pores of the first sample, the high percentage sample 20, are greater than or equal to sixty Angstroms. A second sample, the medium percentage sample 22, includes approximately 21% of pores that are greater than or equal to sixty Angstroms. Finally, the third sample, the low percentage sample 24, includes approximately 6.6% of all pores which are greater than sixty Angstroms.

Figure 3:
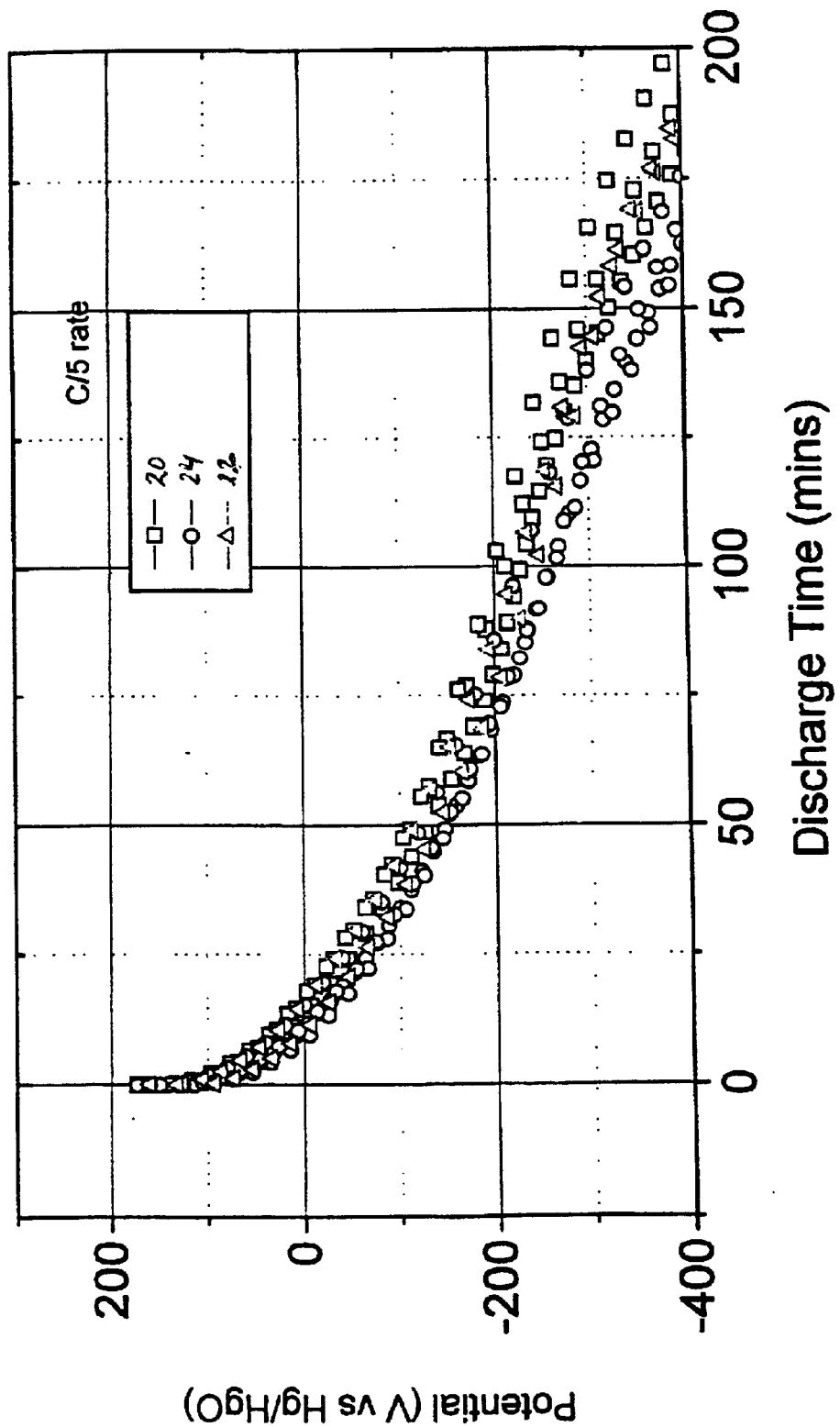
FIG. 3 is a collection of graphs illustrating the discharge curves of alkaline cells having a cathode constructed with each of the materials of FIG. 2

Referring now to FIG. 3, a chart illustrating the discharge time in minutes for an alkaline battery comprising a cathode 12 constructed of each of high percentage 20, medium percentage 22, and low percentage 24 manganese dioxide materials is shown. Initially, each of the batteries is charged to a level of approximately 190 Volts as compared to a Mercury/Mercury Oxide (Hg/HgO) reference electrode. The batteries are each discharged at a C/5 rate to a voltage of approximately −400 V, again as compared to the Hg/HgO electrode. Those skilled in the art of battery technology will understand that the discharge of a battery in terms of a "C" rate, is the approximate time, in hours, over which all or most of the battery electrical capacity is removed. The discharge rate also indirectly specifies the electrical load which would be capable of consuming all or most of the battery capacity in a fixed period of time. Therefore, a C/5 rate means that the battery discharge cycle extends for approximately 5 hours under the specified load.

Referring still to FIG. 3, it can be seen that the battery having a cathode 12 constructed of the high percentage material 20, which has the highest percentage of large pores among the three tested materials, also exhibits the highest discharge time. Cathodes 14 constructed of the medium percentage 22 and low percentage 24 materials discharge more quickly, in correspondence with the concentration level of large pores in the magnesium dioxide. The discharge time of the battery therefore increases with higher concentrations of large pore size.

Figure 4:
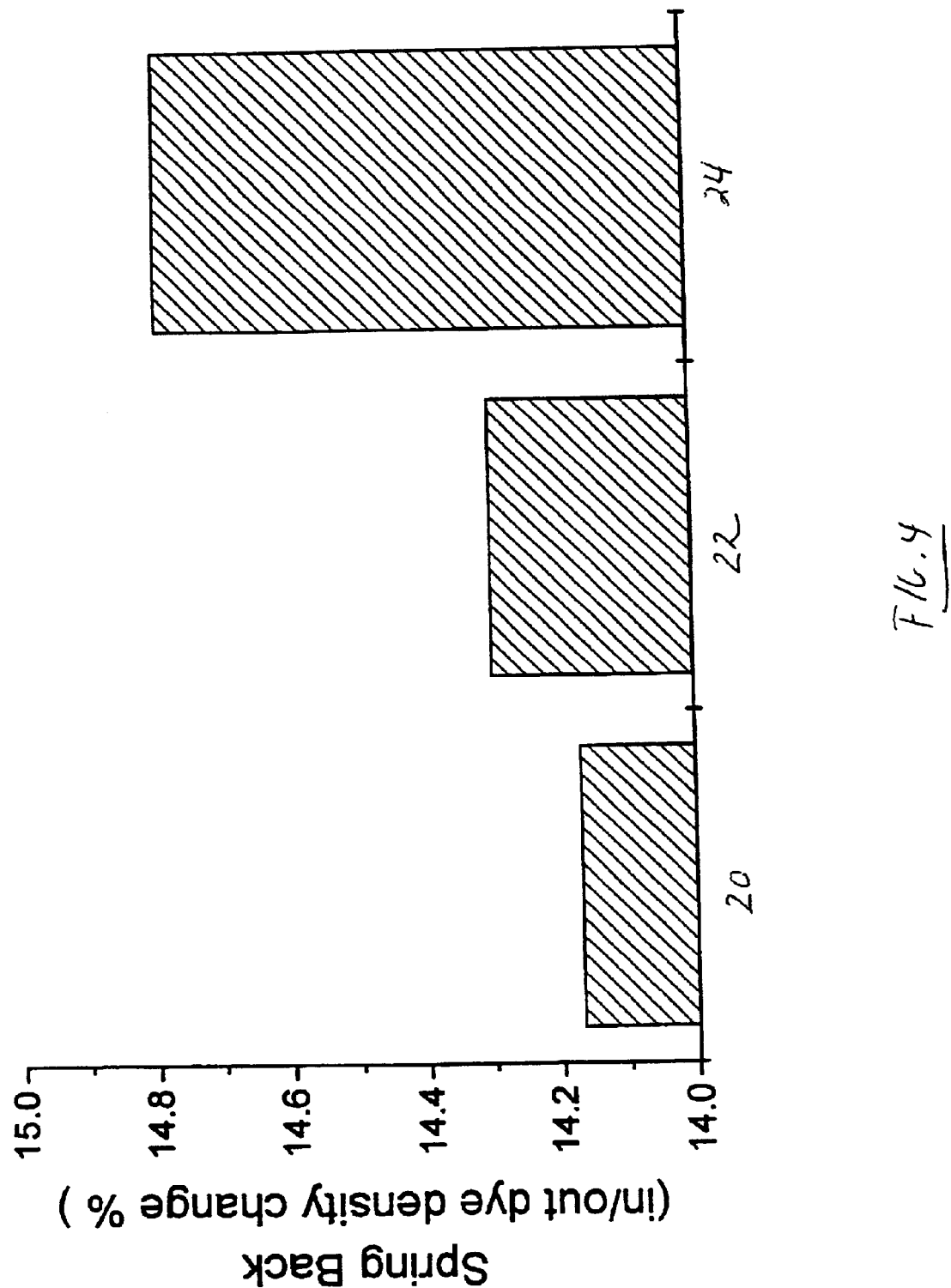
FIG. 4 is a graph illustrating the spring back, or percent change in the size of the cathode formed in a die press operation, of a cathode constructed of each of the materials of FIG. 2.

Referring now to FIG. 4, a chart illustrating the relative spring back or rebounce for a cathode 12 constructed in accordance with each of the cathodes constructed of high percentage 20, medium percentage 22, and low percentage 24 manganese dioxide is shown. The spring back is shown as the percent change in density of the cathode 12 in the die and the density of the cathode 12 after it is removed from the die. The high percentage 20 manganese dioxide material which has the largest total volume of large pores, exhibits the smallest degree of spring back. The cathode 12 constructed of high percentage 20 manganese dioxide therefore more closely retains its shape when released from the die press, is therefore less likely to be stretched beyond a useable shape, and is less likely to result in a loss of material or manufacturing time due to spring back. The medium percentage 22 and low percentage 24 manganese dioxide are more likely to be deformed beyond a useable shape, in correspondence to the percentage of large pores in the material.

The manganese dioxide utilized in the present invention can include any of the standard forms of manganese dioxide used in battery cathodes. As shown above, increasing the number of large pores in the manganese dioxide increases the performance and manufacturability of the battery. However, concentrations of large pores wherein at least 30% of the pores in the total pore volume of the manganese dioxide have a pore size greater than sixty Angstroms have been shown to be particularly effective. Manganese dioxide having these characteristics can be identified through testing. One known method of determining the pore size distribution of pores in a manganese dioxide material is to use the desorption isotherm. Initially, a predetermined amount of nitrogen is placed in a closed container, and the pressure inside the container is measured. After this initial pressure reading is determined, a predetermined amount of manganese dioxide is placed in the container. The pressure is measured a second time to determine the value ($P_0/P$).

$$r_K = \frac{-2\gamma V_m}{RT \ln(p/p_0)}$$

where $\gamma$=the surface tension of nitrogen at its boiling point (8.85 ergs/cm$^2$) at 77K $V_m$=the molar volume of liquid nitrogen (34.6 cm$^2$/mol)

R=gas constant (8.314×10$^7$ ergs/deg mol)

T=boiling point of nitrogen (77K)

P/p$_0$=relative pressure of nitrogen

R$_k$=the Kelvin radius of the pore

Using the constant values defined above, the equation reduces to:

$$r_K(\overset{\circ}{A}) = \frac{4.15}{\log(p_0/p)}$$

The actual pore radius size is then given by:

$$r_p = r_K + t$$

where t is the thickness of the adsorbed layer. The thickness t is equivalent to 3.54 $V_{ADS}/V_M$ in which 3.54 Angstroms is the thickness of one nitrogen molecule layer and $V_{ADS}/V_M$ is the ratio of the volume of nitrogen adsorbed at the completion of a monolayer for a nonporous solid of the same composition as the porous sample, in this case manganese dioxide.

The manganese dioxide material can comprise a single material having a significant number of large pores. Alternatively, if a selected manganese dioxide material does not include a sufficient number of large-sized pores, manganese dioxide having the defined characteristics can be constructed by combining particles from two or more types or manufacturers of manganese dioxide.

In some embodiments, the cathode 12 can also include graphite particles, alkali metal titanates or alkaline earth metal titanates, titanium oxy salt, or other materials known to those of skill in the art. The cathode 12 may further include a binder. Examples of binders used in cathodes include polyethylene powders, polyacrlyamides, Portland cement and fluorocarbon resins, such as PVDF and PTFE.

The cathode 12 may also can include other additives. Examples of additives which may be used are disclosed in U.S. Pat. No. 5,342,712, which is hereby incorporated by reference. In some embodiments, the cathode 12 preferably includes from about 0.2 w.p. to about 2 w.p. TiO$_2$, and more preferably about 0.8 w.p. TiO$_2$.

In certain embodiments, a layer of conductive material may be disposed between the cell's cylindrical metal container and the cathode 12 to further enhance the performance of the battery. This layer may be disposed along the inner surface of container, along the outer circumference of the cathode 12 or both. Typically, this conductive layer is formed of a carbonaceous material. Such materials include LB1000 (Timcal), Eccocoate 257 (W. R. Grace & Co.), Electrodag 109 (Acheson Industries, Inc.), Electrodag 112 (Acheson) and EB005 (Acheson).

The anode 14 can be formed of any of the standard zinc particle materials used in battery anodes. Often, the anode 14 is formed of a zinc gel that includes the zinc particles, a gelling agent and minor amounts of additives, such as gassing inhibitors. In addition, a portion of the electrolytic solution is dispersed throughout the anode 14.

Typically, the anode 14 includes one or more gelling agents. Such gelling agents may include polyacrylic acids, polyacrylates, carboxymethylcellulose, salts of polyacrylic acids, grafted starch materials, or combinations thereof. Preferably, the anode 14 includes from about 0.2 w.p. to about 1 w.p. total gelling agent, more preferably from about 0.4 w.p. to about 0.7 w.p., and most preferably from about 0.5 w.p. to about 0.6 w.p. These weight percentages correspond to when the electrolytic solution is dispersed throughout the anode.

The anode 14 can also include gassing inhibitors. These gassing inhibitors can be in organic materials such as bismuth, tin, lead and indium. Alternatively, gassing inhibitors can be organic compounds such as phosphate esters, ionic surfactants or non-ionic surfactants. Examples of ionic surfactants are disclosed in, for example, U.S. Pat. No. 4,777,100, which is hereby incorporated by reference.

The separator utilized in the present invention may include any one of the many conventional separators used in alkaline electrochemical cells. In some embodiments, the separator is formed of two layers of non-woven, non-membrane material with one layer being disposed along the surface of the other. To minimize the volume of the separator while providing an efficient battery, each layer of non-woven, non-membrane material can have a basis weight of about 54 grams per square meter, a thickness of about 5.4 mm when dry and a thickness of about 10 mm when wet. In these embodiments, the separator preferably does not include a layer of member material or a layer of adhesive between the non-woven, non-membrane layers. Generally, the layers can be substantially devoid of fillers, such as inorganic particles.

In other embodiments, the separator may include an outer layer of cellophane with a layer of non-woven material. The separator may also include an additional layer of non-woven material. The cellophane layer can be adjacent to either the cathode 12 or the anode 14. Preferably, the non-woven material contains from about 78 w.p. to about 82 w.p. PVA and from about 18 w.p. to about 22 w.p. rayon with a trace of surfactant.

The electrolytic solution dispersed throughout the alkaline cell may be of any of the conventional electrolytic solutions used in batteries. Typically the electrolytic solution is an aqueous hydroxide solution. Such aqueous hydroxide solutions include, for example, potassium hydroxide solutions and sodium hydroxide solutions. In some embodiments, the electrolytic solution is an aqueous potassium hydroxide solution, including from about 33 w.p. to about 38 w.p. potassium hydroxide.

The cells of the present invention may also include additives that inhibit the corrosion of zinc. One beneficial component that can be added to the cell to inhibit the corrosion of zinc is an ethylene oxide polymer and derivatives thereof. Some examples for materials that can be added to the anode 14 would include lead, indium, cadmium, bismuth, thallium, tin, aluminum, and compounds thereof. Suitable indium-contanian compounds may include indium hydroxide, indium oxide, indium metal and the like.

The present invention can be more fully understood by reference to the following examples, which are intended to be exemplary and are not intended in any way to limit the scope of the invention.

We claim:

1. An alkaline electrochemical cell, comprising a cathode, an anode, a separator disposed between the cathode and the anode, and an aqueous electrolyte contacting the cathode, the anode and the separator, the cathode comprising porous electrolytic manganese dioxide having a pore volume, at least six and six tenths percent of the pore volume being attributable to pores having a pore opening size of substantially sixty angstroms or greater.

2. The electrochemical cell as defined in claim 1, wherein the electrochemical cell is selected from the group consisting of AA batteries, AAA batteries, AAAA batteries, C batteries, D batteries, and 9-Volt batteries.

3. The electrochemical cell as defined in claim 1, wherein the size is determined using a desorption isotherm test.

4. The electrochemical cell as defined in claim 1, at least thirty percent of the total pore volume being attributable to pores having a pore opening size of substantially sixty angstroms or greater.

5. The electrochemical cell as defined in claim 1, at least thirty-six percent of the total pore volume being attributable to pores having a pore opening size of substantially sixty angstroms or greater.

* * * * *